(12) United States Patent
Marra, III et al.

(10) Patent No.: US 6,612,685 B1
(45) Date of Patent: Sep. 2, 2003

(54) METHOD OF SELECTIVELY UNDERFEEDING PRINT MEDIA IN AN INK JET PRINTER

(75) Inventors: Michael Anthony Marra, III, Lexington, KY (US); Randall David Mayo, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/073,466

(22) Filed: Feb. 11, 2002

(51) Int. Cl.[7] ................................................. B41J 2/21
(52) U.S. Cl. ........................................................ 347/41
(58) Field of Search .............................. 347/15, 16, 12, 347/37, 40, 42

(56) References Cited

U.S. PATENT DOCUMENTS

| | | | |
|---|---|---|---|
| 4,558,963 A | 12/1985 | Applegate et al. | 400/120 |
| 4,617,580 A | 10/1986 | Miyakawa | 346/136 |
| 4,728,968 A * | 3/1988 | Hillmann et al. | 347/43 |
| 5,050,858 A | 9/1991 | Nakamura | 271/265 |
| 5,197,726 A | 3/1993 | Nogami | 271/110 |
| 5,207,516 A | 5/1993 | Suzuki | 400/120 |
| 5,265,861 A | 11/1993 | Schaffner et al. | 271/182 |
| 5,526,033 A | 6/1996 | Higashi et al. | 347/218 |
| 5,600,353 A | 2/1997 | Hickman et al. | 347/43 |
| 5,686,944 A | 11/1997 | Takagi et al. | 347/41 |
| 5,714,990 A | 2/1998 | Courtney | 347/14 |
| 5,777,638 A | 7/1998 | Salter et al. | 347/12 |
| 5,801,722 A | 9/1998 | Ueda et al. | 347/16 |
| 5,805,183 A | 9/1998 | Lidke et al. | 347/41 |
| 5,924,686 A | 7/1999 | Jacobson et al. | 271/3.17 |
| 5,959,646 A | 9/1999 | Bates et al. | 347/43 |
| 6,015,201 A | 1/2000 | Asakura | 347/19 |
| 6,017,114 A | 1/2000 | Elgee et al. | 347/40 |
| 6,113,289 A | 9/2000 | Saito et al. | 400/58 |
| 6,145,960 A | 11/2000 | Kanda et al. | 347/41 |
| 6,164,756 A * | 12/2000 | Takahashi et al. | 347/43 |
| 6,170,932 B1 | 1/2001 | Kanaya et al. | 347/41 |
| 6,179,289 B1 | 1/2001 | Matsushita et al. | 271/266 |
| 6,250,734 B1 | 6/2001 | Otsuki | 347/16 |
| 6,257,692 B1 | 7/2001 | Yokoi et al. | 347/16 |
| 6,257,698 B1 | 7/2001 | Bloomberg et al. | 347/40 |
| 6,260,941 B1 | 7/2001 | Su et al. | 347/19 |
| 6,264,298 B1 | 7/2001 | Mantell | 347/15 |
| 6,290,329 B1 | 9/2001 | Terasawa et al. | 347/43 |
| 6,299,283 B1 | 10/2001 | Kakutani et al. | 347/41 |
| 6,310,640 B1 | 10/2001 | Askeland | 347/41 |
| 6,325,489 B2 | 12/2001 | Endo | 347/43 |
| 6,533,393 B1 * | 3/2003 | Meyer et al. | 347/43 |
| 2001/0005212 A1 | 6/2001 | Otsuki | 347/41 |
| 2001/0017638 A1 | 8/2001 | Otsuki | 347/41 |
| 2001/0030672 A1 | 10/2001 | Gudaitis et al. | 347/37 |
| 2001/0040598 A1 | 11/2001 | Dunand | 347/16 |
| 2001/0052915 A1 | 12/2001 | Suzuki | 347/43 |

* cited by examiner

*Primary Examiner*—Judy Nguyen
*Assistant Examiner*—Julian D. Huffman
(74) *Attorney, Agent, or Firm*—Taylor & Aust, PC

(57) ABSTRACT

In an inkjet printer, a print medium is selectively printed on in a multiple pass printing mode and/or a single pass printing mode. During the single pass printing mode, the print medium is printed on in a single pass height. The print medium is advanced a distance less than the single pass height. During the multiple pass printing mode, the print medium is printed on in a multiple pass height. The multiple pass height is less than the single pass height. The print medium is advanced a distance approximately equal to the multiple pass height.

16 Claims, 4 Drawing Sheets

METHOD OF SELECTIVELY UNDERFEEDING PRINT MEDIA IN AN INK JET PRINTER

BACKGROUND OF THE INVENTION

1. Field of the Invention

The present invention relates to a method of printing in an ink jet printer, and, more particularly, to a method of underfeeding print media during printing with an ink jet printer.

2. Description of the Related Art

An ink jet printer typically includes an ink jet cartridge which is carried by a carriage assembly. The ink jet cartridge includes a printhead having a plurality of nozzles, from which ink is jetted onto the print medium at selected ink dot locations within an image area. The carriage assembly moves the printhead across the print medium in a scan direction while the ink dots are jetted onto selected pixel locations within a given raster line. Between passes of the printhead, the print medium is advanced a predetermined distance and the printhead is again scanned across the print medium.

An ink jet printer may be designed to slightly underfeed the print medium, essentially indexing a small amount short of the ideal index amount. In other words, raster lines between adjacent swaths may slightly overlap one another. This is done to hide indexing errors due to the mechanical system, as well as the software algorithm used to control this motion. The theory behind this is that a gap (or white space) between consecutively printed swaths, due to a slight overfeed error, is more visible to the user than a slightly darker line, due to an underfeed error.

Printing may occur using a single pass technique or a multiple pass technique. A multiple pass technique such as shingling is utilized to reduce print artifacts which may occur as a result of a clogged nozzle or the like by using multiple nozzles to print on a given raster line.

Intentionally underfeeding the print medium in the advance direction typically is acceptable for single pass print modes to mask indexing errors associated with the advance of the print medium. However, intentionally underfeeding the print medium during a shingling mode may cause the generation of additional print artifacts which may be objectionable.

What is needed is a method of printing which underfeeds the print medium in the advance direction only when such underfeeding results in an overall improved print quality.

SUMMARY OF THE INVENTION

The present invention provides a method of printing with an inkjet printer, wherein the print media is intentionally underfed into the print zone during single pass printing, and is not intentionally underfed into the print zone during multiple pass printing.

The invention comprises, in one form thereof, a method of printing on a print medium with an inkjet printer. The print medium is selectively printed on in a multiple pass printing mode and/or a single pass printing mode. During the single pass printing mode, the print medium is printed on in a single pass height. The print medium is advanced a distance less than the single pass height. During the multiple pass printing mode, the print medium is printed on in a multiple pass height. The multiple pass height is less than the single pass height. The print medium is advanced a distance approximately equal to the multiple pass height.

An advantage of the present invention is that the print media is fed into the print zone to take advantage of intentional underfeeding only when the benefits of such underfeeding outweigh disadvantages caused by errors induced by a given print mode.

Another advantage is that the underfeeding may selectively occur real time during actual printing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrate one preferred embodiment of the invention, in one form, and such exemplification is not to be construed as limiting the scope of the invention in any manner.

DETAILED DESCRIPTION OF THE INVENTION

Figure 1:
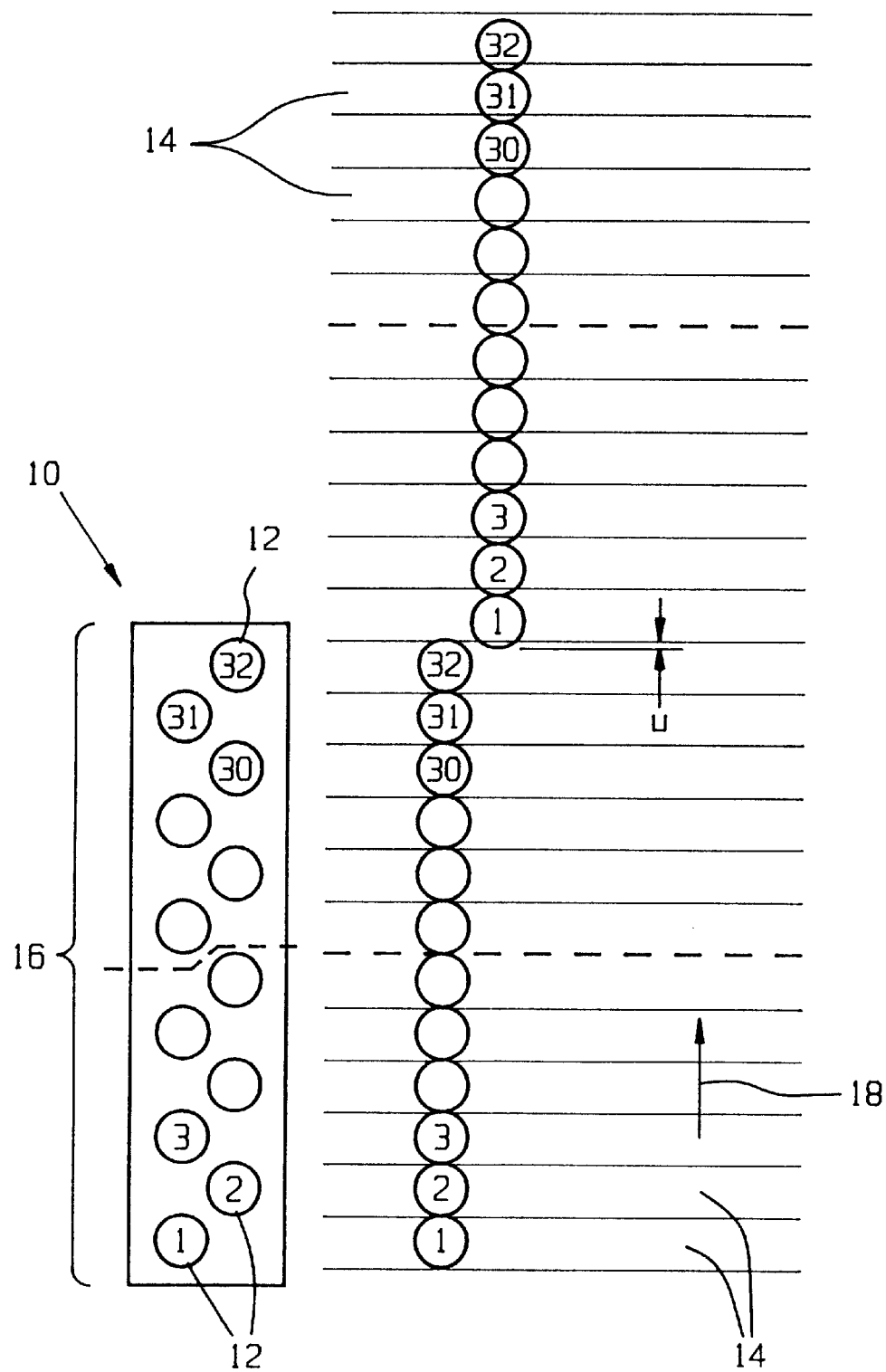
FIG. 1 illustrates a method of printing of the present invention which underfeeds the print media during a single pass print mode.

Referring now to the drawings, an embodiment of the method of the present invention for printing on a print medium with an ink jet printer will be described. The ink jet printer includes a print head 10 having a plurality of nozzles 12 which are sequentially arranged in an offset relationship relative to each other to define a plurality of vertically adjacent raster lines 14 overlying an image area of a print medium, such as paper, transparency, etc. For simplicity and ease of description, printhead 10 is assumed to include only 32 nozzles 12, each with a diameter of approximately $\frac{1}{600}$ inch. Of course, in actuality, printhead 10 typically includes many more nozzles than the 32 nozzles shown in FIG. 1. Nonetheless, the methodology of the present invention is the same regardless of the number of nozzles utilized. Moreover, the diameter of each nozzle 12, as well as the height of each corresponding raster line 14, may vary from one application to another (e.g., $\frac{1}{600}$ inch, $\frac{1}{1200}$ inch or $\frac{1}{2400}$ inch). Depending upon the number of nozzles and the diameter of each nozzle, printhead 10 defines a printhead height 16 in which printing may occur on the print medium during scanning of printhead 10 across the print medium. Nozzles 12 have a diameter which is the same as the height of raster lines 14, depending upon the particular configuration of printhead 10.

Referring now to FIG. 1, there is shown a method of printing on the print medium in a single pass printing mode. As printhead 10 scans across the print medium, ink is jetted onto the print medium at selected ink dot locations in each of the twelve raster lines 14, as indicated by the ink dots numbered 1–12. The twelve raster lines 14 define a single pass height which also corresponds to height 16 of printhead 10. The print medium is then advanced a distance slightly less than the single pass height or printhead height 16. This is represented by the underfeed distance U shown in FIG. 1. This underfeed U is done to hide indexing errors due to the mechanical system, as well as the algorithm used to control the advancing motion. If the print medium is not underfed, it is possible for the print medium to be advanced in advance direction 18 too far such that a white line occurs between adjacent passes of printhead 10 on the print medium. It is believed that a slightly darker line caused by an underfeed condition is less objectionable than a gap (or white space) between consecutively printed swaths which may result from a slight overfeed error.

In the embodiment shown, the print medium is advanced in advance direction 18 to achieve a slight underfeed condition between adjacent raster lines between the printed swaths. More particularly, the print medium is underfed a distance U of between approximately 0.10% and 0.35% of the printhead height 16; preferably underfed a distance U of between approximately 0.10% and 0.20% of the printhead height 16; and more preferably is underfed a distance U of approximately 0.15% of the printhead height 16. An underfeed distance within these parameters has been found to be effective to reduce gaps or white spaces between adjacent printed swaths.

Figure 2:
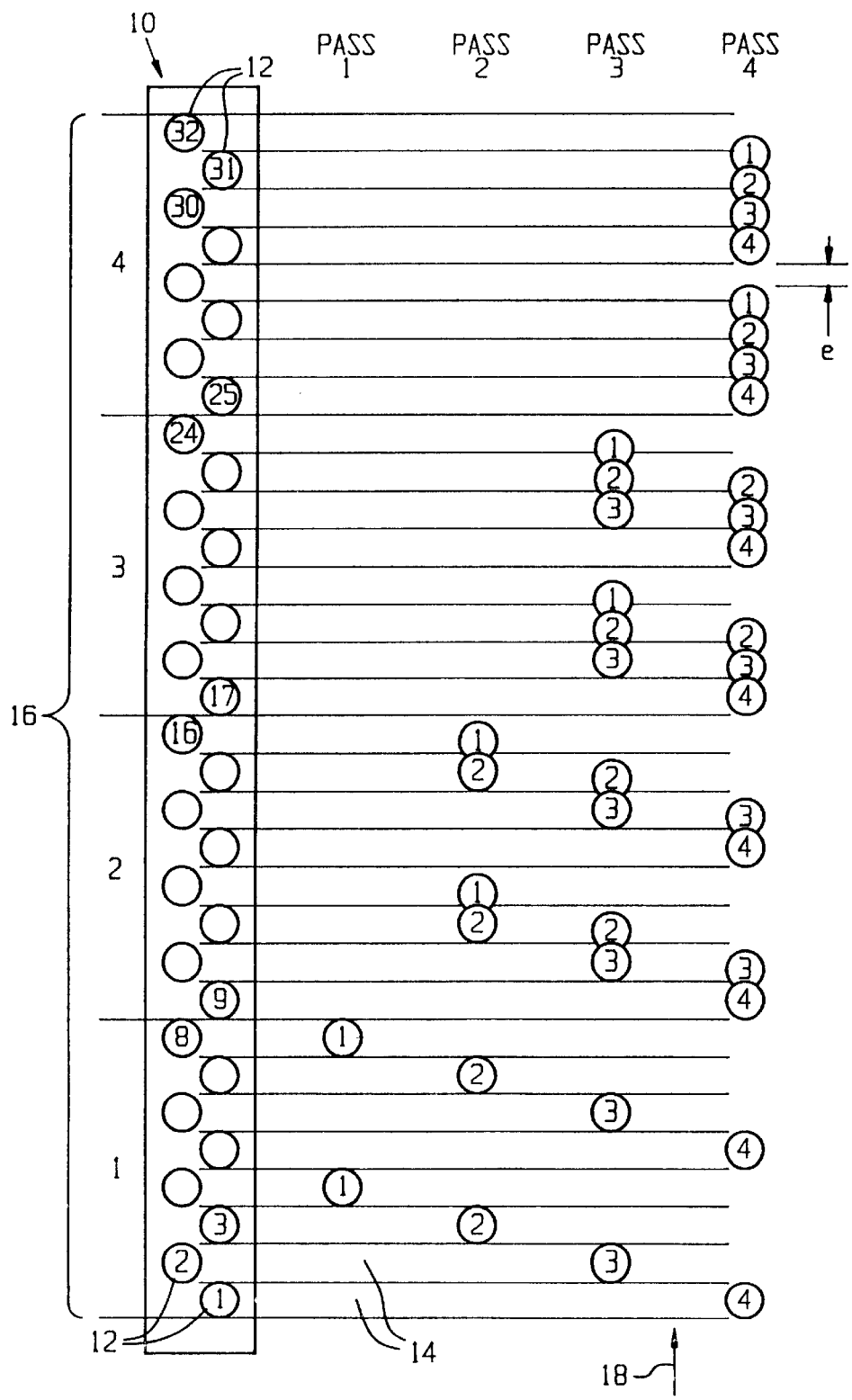
FIG. 2 illustrates a method of printing which underfeeds the print media during a multiple pass print mode.

Referring now to FIG. 2, printhead 10 is utilized to print on the print medium in a multiple pass printing mode, such as a shingling or dithering mode. Printhead 10 prints on the print medium in a multiple pass height which is less than the height 16 of printhead 10 (corresponding to the single pass height shown in FIG. 1). The multiple pass height generally is a fraction of the printhead height 16, such as one-fourth of printhead height 16, one-third of printhead height 16 or one-half of printhead height 16, dependent upon the particular printing application. In the embodiment of the method shown in FIG. 2, printhead 10 is assumed to be used in a four pass shingling mode, and thus each multiple pass height corresponds to the height of a nozzle group of eight successively adjacent nozzles 12, as indicated by the reference numbers 1–4 to the left of printhead 10. Printhead 10 prints on the print medium in a multiple pass mode such that each region of the print medium receives one pass from each of the subdivided nozzle groups.

FIG. 2 illustrates the cumulative affect of intentionally underfeeding the print medium in advance direction 18 as a given raster line is advance through each of the four passes associated with printhead 10. Shingling generally is utilized to reduce print artifacts by printing on a single raster line with multiple passes and multiple different nozzles of printhead 10. Thus, e.g., print artifacts associated with a clogged nozzle are reduced by using other nozzles to print on the same raster line as the print medium is advanced between successive passes with printhead 10.

Generally, during pass 1, printhead 10 is scanned across the print medium and ink dots are placed on the print medium at selected ink dot locations using nozzles 1–8. The print medium is then advanced in advance direction a distance corresponding to the multiple pass height of one-fourth the height of printhead 10. During pass 2, nozzles 9–16 are used to eject ink drops at selected ink dot locations on the print medium which generally align with the raster lines previously printed using nozzles 1 through 8 (except for the underfeed which will be described in more detail hereinafter). The bottom 8 nozzles also print a first pass on the preceding next 8 adjacent raster lines. This process of advancing the print medium according to the multiple pass height (i.e., nozzle group of 8 nozzles) and scanning printhead 10 across the print medium occurs for all 4 passes such that four separate nozzles may be used to eject ink droplets on any given raster line (e.g., nozzles 3, 11, 19 and 27 corresponding to the top raster line of each pass).

However, as with the method of printing shown in FIG. 1, the shingling method shown in FIG. 2 underfeeds the print medium in advance direction 18 between each of adjacent passes 1–4 of printhead 10 across the print medium. For each adjacent pass, the underfeed amount is added to the previous underfeed amounts such that the total underfeed between passes 1 and 4 is cumulative. Although the underfeeding results in slight overlap of the ink drops which are placed on a given raster line in each of passes 1–4, it is possible for a gap or white space to occur between the fourth pass associated with one raster line and the first pass associated with an adjacent raster line. Such a white space or gap may be objectionable when using the shingling printing method shown in FIG. 2. This accumulated underfeed error associated with an ink dot printed between pass 1 (represented by the dots labeled with the reference letter 1) and pass 4 (represented by the dots labeled with the reference letter 4) is represented by the reference letter e in FIG. 2.

Figure 3:
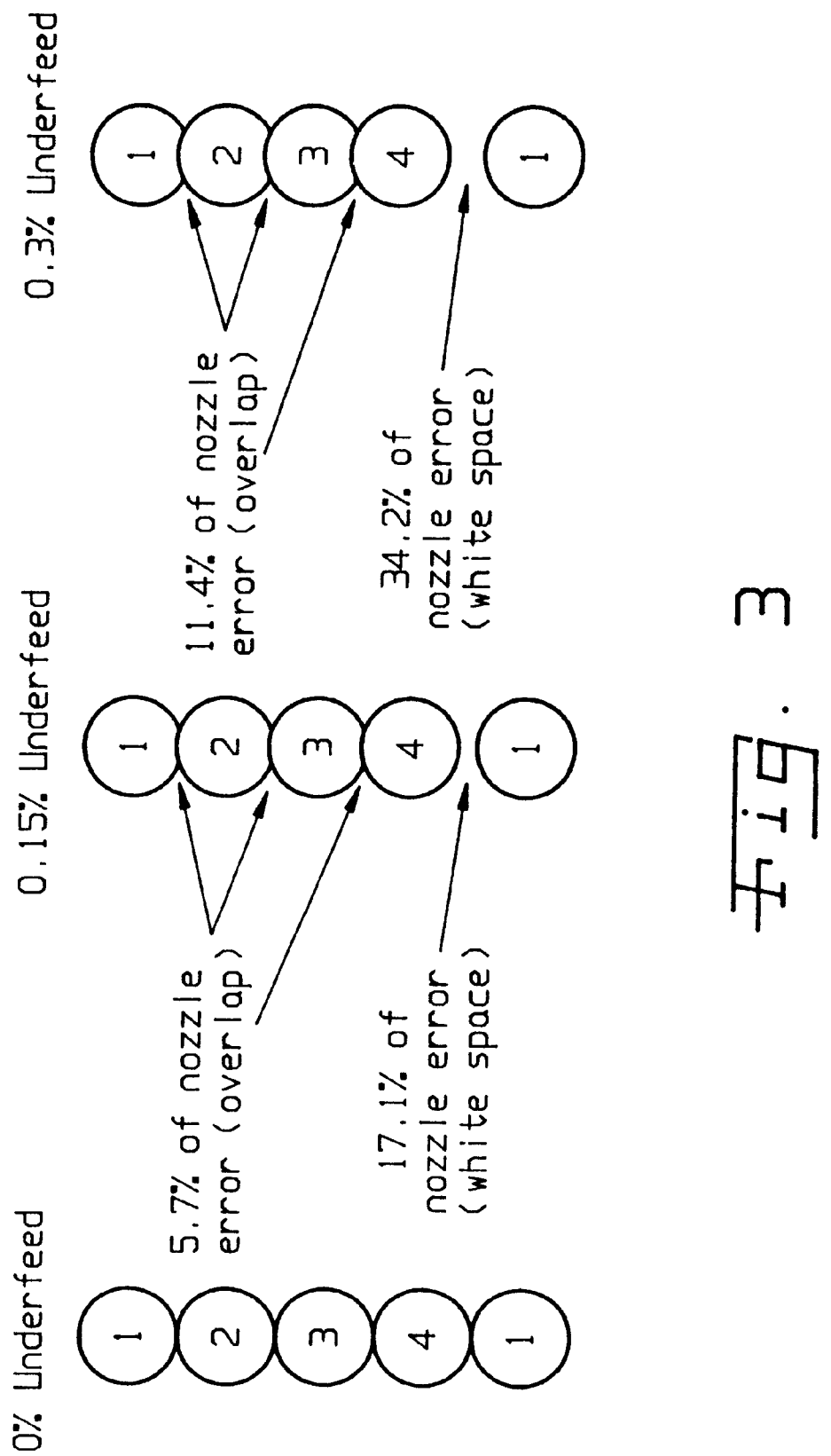
FIG. 3 graphically illustrates nozzle errors which may occur during underfeeding of the print media in a multiple pass print mode.

For example, consider a 152 nozzle printhead with a nozzle pitch of 600 dpi, which when used in a 4 pass printing mode is subdivided into 4 groups of 38 nozzles. A 0.15% underfeed combined with four pass shingling results in an error of 5.7% of a 600 dots per inch (dpi) nozzle for each index move. After three moves this accumulates to 17.1% (about 7$\mu$m) of a nozzle error between a dot printed on the first and fourth passes. This is illustrated graphically in FIG. 3. Similarly, a 0.30% underfeed combined with four pass shingling results in an error of 11.4% of a 600 dpi nozzle for each index move. After three moves this accumulates to a 34.2% nozzle error between a dot printed on the first and fourth passes.

Figure 4:
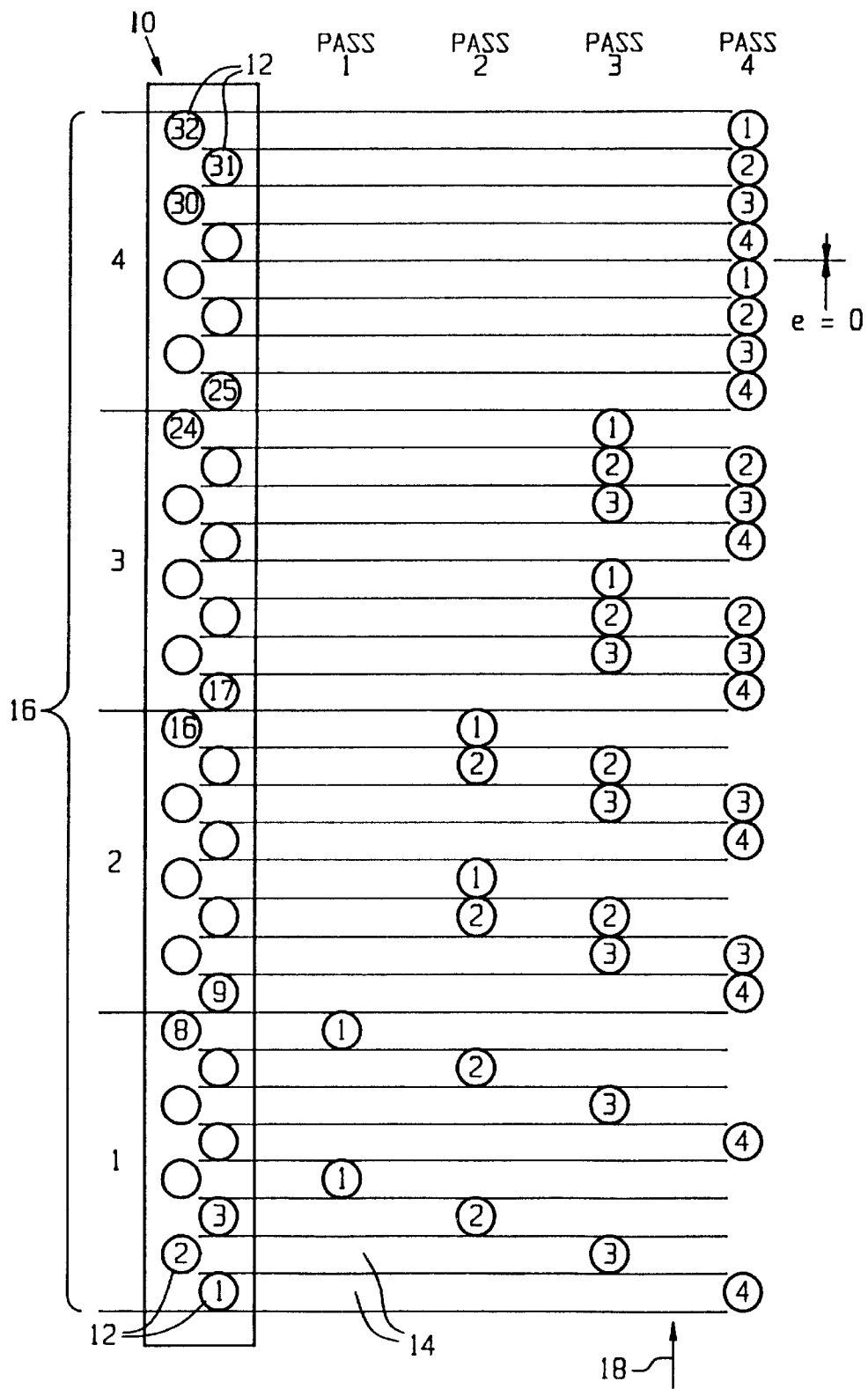
FIG. 4 illustrates an embodiment of a method of printing of the present invention which does not underfeed the print media during a multiple pass print mode.

Referring now to FIG. 4, another method of printing on the print medium using a shingling technique is illustrated. However, the print medium is not underfed in advance direction 18 between adjacent passes 1–4. The scanning of printhead 10 during each pass and the advancing of the print medium one-fourth of the height of printhead 10 occurs the same as the embodiment described above with reference to FIG. 2, but the print medium is not underfed in advance direction 18. This substantially inhibits the formation of gaps or white spaces between an ink dot printed during the first and fourth passes of the shingling method.

According to an aspect of the present invention, the print medium is underfed in advance direction 18 during single pass printing, and is not underfed in the advance direction 18 during multiple pass printing. More particularly, in the embodiment shown, during single pass printing as shown in FIG. 1 the print medium is underfed a distance U between adjacent swaths of printhead 16. During printing using a shingling technique, as shown in FIG. 4, the print medium is not underfed in advance direction 18 between adjacent passes or swaths. Thus, no underfeed accumulation and associated nozzle error occurs. For purposes of description, a print medium is described as being advanced a distance equal to the multiple pass height (a nozzle group height of 8 nozzles in the embodiment of FIG. 4) between consecutive passes of printhead 10 across the print medium. Of course, it will be understood that the advance distance may be only approximately equal to the multiple pass height since slight errors associated with the mechanical system or software may occur. What is meant is that the print medium is not intentionally underfed in the advance direction between consecutive passes during the multiple pass printing mode, but is intentionally underfed during the single pass printing mode.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing on a print medium with an inkjet printer, comprising the steps of:
    providing the inkjet printer with a printhead having a plurality of nozzles corresponding to a plurality of raster lines printed on the print medium, said raster lines having a common raster height;
    printing on the print medium in a single pass printing mode, including the substeps of:
        printing on the print medium in a single pass height; and
        advancing the print medium a distance less than said single pass height; and
    printing on the print medium in a multiple pass printing mode, including the substeps of:
        printing on the print medium in a multiple pass height, said multiple pass height being less than said single pass height; and
        advancing the print medium a distance approximately equal to said multiple pass height, such that said raster lines do not overlap from one pass to another.

2. The method of printing of claim 1, wherein said printhead has a height, said single pass height corresponding to said printhead height.

3. The method of printing of claim 1, wherein said multiple pass printing mode comprises a shingling mode.

4. The method of printing of claim 1, wherein said printhead has a height, said multiple pass height corresponding to a fraction of said printhead height.

5. The method of printing of claim 4, said multiple pass height corresponding to one of one-fourth of said printhead height, one-third of said printhead height, and one-half of said printhead height.

6. A method of printing on a print medium with an inkjet printer, comprising the steps of:
    providing a printhead having a height;
    printing on the print medium in a single pass printing mode, including the substeps of:
        printing on the print medium in a single pass height, said single pass height corresponding to said printhead height; and
        advancing the print medium a distance less than said single pass height, said advancing substep includes underfeeding the print medium a distance of between approximately 0.10% and 0.35% of said printhead height; and
    printing on the print medium in a multiple pass printing mode, including the substeps of:
        printing on the print medium in a multiple pass height, said multiple pass height being less than said single pass height; and
        advancing the print medium a distance approximately equal to said multiple pass height.

7. The method of printing of claim 6, wherein said advancing substep during said single pass printing mode includes underfeeding the print medium a distance of between approximately 0.10% and 0.20% of said printhead height.

8. The method of printing of claim 7, wherein said advancing substep during said single pass printing mode includes underfeeding the print medium a distance of approximately 0.15% of said printhead height.

9. A method of printing on a print medium with an inkjet printer, comprising:
    providing the inkjet printer with a printhead having a plurality of nozzles corresponding to a plurality of raster lines printed on the print medium, said raster lines having a common raster height;
    selectively printing on the print medium in a multiple pass printing mode and a single pass printing mode, including the substeps of:
        during said single pass printing mode:
            printing on the print medium in a single pass height; and
            advancing the print medium a distance less than said single pass height; and
        during said multiple pass printing mode:
            printing on the print medium in a multiple pass height, said multiple pass height being less than said single pass height; and
            advancing the print medium a distance approximately equal to said multiple pass height, such that said raster lines do not overlap from one pass to another.

10. The method of printing of claim 9, wherein said printhead has a height, said single pass height corresponding to said printhead height.

11. The method of printing of claim 9, wherein said multiple pass height corresponds to a group of said printhead nozzles.

12. The method of printing of claim 9, wherein said printhead has a height, said multiple pass height corresponding to a fraction of said printhead height.

13. The method of printing of claim 17, said multiple pass height corresponding to one of one-fourth of said printhead height, one-third of said printhead height, and one-half of said printhead height.

14. A method of printing on a print medium with an inkjet printer, comprising:
    providing the inkjet printer with a printhead having a height;
    selectively printing on the print medium in a multiple pass printing mode and a single pass printing mode, including the substeps of:
        during said single pass printing mode:
            printing on the print medium in a single pass height, said single pass height corresponding to said print head height; and
            advancing the print medium a distance less than said single pass height, said advancing substep includes underfeeding the print medium a distance of between approximately 0.10% and 0.35% of said printhead height; and during said multiple pass printing mode:

printing on the print medium in a multiple pass height, said multiple pass height being less than said single pass height; and advancing the print medium a distance approximately equal to said multiple pass height.

15. The method of printing of claim 14, wherein said advancing substep during said single pass printing mode includes underfeeding the print medium a distance of between approximately 0.10% and 0.20% of said printhead height.

16. The method of printing of claim 15, wherein said advancing substep during said single pass printing mode includes underfeeding the print medium a distance of approximately 0.15% of said printhead height.

* * * * *